March 31, 1925.

W. I. TWOMBLY

INDICATOR FOR TEMPERATURE CONTROLS

Filed June 6, 1922

1,531,767

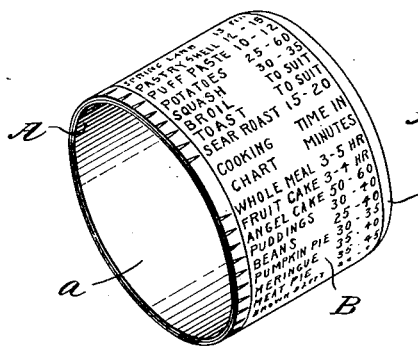

Fig. 1.

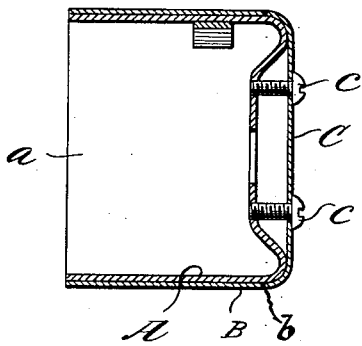

Fig. 2.

Fig. 3.

| COOKING CHART | TIME IN MINUTES |
|---|---|
| ▷ WHOLE MEAL | – 3 - 5 HR. |
| ▷ FRUIT CAKE | – 3 - 4 HR. |
| ▷ ANGEL CAKE | – 30 - 60 |
| ▷ PUDDINGS | – 30 - 40 |
| ▷ BEANS | – 25 - 40 |
| ▷ PUMPKIN PIE | – 30 - 35 |
| ▷ MERINGUE | – 35 - 40 |
| ▷ MEAT PIE | – 25 - 45 |
| ▷ BROWN BETTY | – 2½ - 3 HR. |
| ▷ GINGER BREAD | – 30 - 35 |
| ▷ CUSTARDS | – 40 - 75 |
| ▷ TIMBALES | – 40 - 75 |
| ▷ OPEN PIES | – 30 - 35 |
| ▷ BREAD | – 45 - 60 |
| ▷ LAYER CAKE | – 20 - 25 |
| ▷ GINGER SNAPS | – 7 - 10 |
| ▷ CASSEROLE | – 2½ - 3 HR |
| ▷ LOAF CAKE | – 35 - 45 |
| ▷ FRITTERS | – 12 - 15 |
| ▷ CORN CAKE | – 20 - 25 |
| ▷ CUP CAKE | – 25 - 30 |
| ▷ BRAN COOKIES | – 12 - 15 |
| ▷ SOUFFLE | – 20 - 30 |
| ▷ BISCUIT (Y) | – 45 - 60 |
| ▷ ROLLED COOKIES | – 10 - 12 |
| ▷ POULTRY | – 20 - 60 |
| ▷ MOLASSES COOK. | – 18 - 20 |
| ▷ FISH | – 20 - 60 |
| ▷ BISCUIT (BP) | – 12 - 15 |
| ▷ POP OVER | – 25 - 30 |
| ▷ MUFFINS | – 25 - 30 |
| ▷ FILLED COOKIES | – 10 - 12 |
| ▷ DOUBLE CRUST PIE | – 30 - 45 |
| ▷ DEEP FRUIT PIE | – 35 - 45 |
| ▷ OPEN CROSS CUT | – 18 - 20 |
| ▷ ROAST BEEF | – 25-PER LB |
| ▷ LOIN OF PORK | – 25-PER LB |
| ▷ FRESH HAM | – 30-PER LB |
| ▷ LOIN OF VEAL | – 25-PER LB |
| ▷ LEG OF LAMB | – 20-PER LB |
| ▷ SPRING LAMB | – 15-PER LB |
| ▷ PASTRY SHELL | – 12 - 15 |
| ▷ PUFF PASTE | – 10 - 12 |
| ▷ POTATOES | – 25 - 60 |
| ▷ SQUASH | – 30 - 35 |
| ▷ TOAST | – TO SUIT |
| ▷ BROIL | – TO SUIT |
| ▷ SEAR ROAST | – 15 - 20 |

INVENTOR.

Willard I. Twombly

BY

ATTORNEY.

Patented Mar. 31, 1925.

1,531,767

UNITED STATES PATENT OFFICE.

WILLARD I. TWOMBLY, OF NEW YORK, N. Y., ASSIGNOR TO H. A. WILSON COMPANY, OF NEWARK, NEW JERSEY, A CORPORATION OF NEW JERSEY.

INDICATOR FOR TEMPERATURE CONTROLS.

Application filed June 6, 1922. Serial No. 566,425.

*To all whom it may concern:*

Be it known that I, WILLARD I. TWOMBLY, a citizen of the United States, and a resident of the borough of Manhattan, city, county, and State of New York, have invented certain new and useful Improvements in Indicators for Temperature Controls, of which the following is a specification.

My invention relates to an indicator embodied in devices for controlling temperatures. More specifically, my invention relates to an indicator adapted for use in connection with a control for governing the temperature of ovens for gas stoves. I will describe an indicator embodying my invention and then point out the novel features thereof in claims.

In the accompanying drawing Fig. 1 is a perspective view of an indicator embodying my invention. Fig. 2 is a vertical cross-sectional view of the indicator shown in Fig. 1. Fig. 3 is a plan view of a cooking chart used in connection with the indicator.

Similar letters of reference designate corresponding parts in all of the figures.

The regulator may be used in connection with any type of temperature control designed to be set for any temperature and to maintain that temperature. For example it may be used in connection with the thermostatic control set forth in an application for Letters Patent, filed by me May 1, 1922, Ser. No. 557,669; or with the control set forth in an application for Letters Patent filed by me May 26, 1922, Ser. No. 563,769.

Referring now to the drawings, the indicator comprises a base A here shown as being cup shaped and having an opening $a$ to receive that part of the control which sets the parts thereof to maintain the temperature for which the control is set. B designates a cooking chart here shown as being in the form of an elongated strip, which is mounted upon the base A and suitable secured thereon. C designates a cover for the end wall of the base and it is secured thereto by means of screws $c$. Advertising or other matter may be placed on the cover C.

The cooking chart B has suitably marked on it temperature divisions $b$, a list of food-stuffs $b^1$, and the periods of time $b^2$, required to cook the food-stuffs. If desired the chart may also contain the figures of the temperature divisions. Instead of using a separate part B maintaining it on the base A, the information for cooking may be applied directly to the base A. It will be understood that a fixed pointer (not shown) is used in connection with the indicator. By turning the indicator relatively to the pointer, the name of any food-stuff may be brought under the pointer. When this is done the operator will then know that the control with which the indicator is associated is then set to maintain the temperature necessary to cook that food-stuff. After that all that is required is to note the length of time required to cook the food-stuff.

What I claim as my invention is:

1. An indicator for temperature controls for cooking ovens, comprising a part adapted for connection with the setting means of the control, and a cooking chart carried thereby and containing food-stuffs arranged in accordance with the temperatures necessary to cook them.

2. An indicator for temperature controls for cooking oven, comprising a part adapted for connection with the setting means of the control, and a cooking chart carried thereby and containing food-stuffs arranged in accordance with the temperatures necessary to cook them, and the length of time for cooking at such temperature.

WILLARD I. TWOMBLY.

Witnesses:
GEO. E. CRUSE,
A. L. VENCILL.